United States Patent Office
3,330,780
Patented July 11, 1967

3,330,780
ALLOPHANATES AS VISCOSITY INDEX IMPROVERS
Garth M. Stanton, Pinole, Calif., assignor to Chevron Research Company, a corporation of Delaware
No Drawing. Filed June 3, 1965, Ser. No. 461,158
3 Claims. (Cl. 252—51.5)

This invention relates to novel lubricant compositions containing novel high molecular weight polymeric viscosity index improvers. More particularly, this invention concerns novel lubricant compositions containing novel allophanate substituted high molecular weight polymeric viscosity index improvers.

Lubricant compositions in many present day applications contain viscosity index improvers in order to be effective over a wide temperature range. Viscosity index is an empirical scale developed by the petroleum industry to give a simple numerical expression to the relation of an oil viscosity to its temperature. With the broad temperature ranges required by modern day engines, it is necessary that the lubricant be sufficiently fluid at low temperatures in order that it circulate freely and provide a lubricating film between wearing surfaces such as bearings, piston rings and cylinder walls. Alternatively, at high temperatures, such as the operating temperatures of internal combustion engines, the lubricant composition must be thick enough to provide a protective lubricating film.

It has now been found that high molecular weight polymers of olefins having an average number of carbons in the range of 8 to 18 and having 1 allophanate group suspended from a side chain per 10 to 20 monomers in the polymer are effective as viscosity index (V.I.) improvers. The polymers have molecular weights in the range of about 100,000 to 500,000 and greatly improve the viscosity index of lubricating oils.

The polymers of this invention have a recurring unit of the following formula:

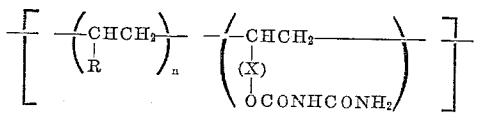

wherein R is an alkyl group of from 4 to 20 carbon atoms, more usually of from 6 to 18 carbon atoms, $n$ is an integer of from 10 to 20, more usually of from 12 to 18, and X is an alkylene group or hydroxyalkylene group of from 4 to 18 carbon atoms, the hydroxy group generally being from 2 to 3 carbons removed from the first carbonyl or carboxy group of the allophanic acid.

The polymer can readily be prepared by copolymerizing a variety of 1-olefins with from 5 to 10 mole per cent of di-olefins. The resulting unsaturated polymer can then be hydroxylated in a variety of ways. The hydroxylated product may then be reacted with biuret to form the desired allophanate.

The olefins are most conveniently polymerized with "Ziegler-type" catalysts. These catalysts generally include a transition metal compound such as the halide, oxide, or alkoxide of titanium and vanadium and an organometallic compound with a metal of Groups I to III of the Periodic Chart. Most conveniently, titanium tri- or tetrachloride or vanadium trichloride or oxychloride is combined with a trialkyl aluminum or dialkyl aluminum halide such as triethyl aluminum, triisobutyl aluminum, diethyl aluminum chloride or ethyl aluminum dichloride. These "Ziegler-type" catalysts are well known in the art and do not require extensive exemplification here. See for example "Stereospecific Catalysis" beginning at page 93 in the journal, Chemical Engineering for Apr. 2, 1962, McGraw-Hill Publishing Company, New York.

The copolymerization is conveniently carried out at temperatures from about 30° C. to about 150° C. at atmospheric pressure. The lower temperatures give copolymers of higher molecular weight. A hydrocarbon diluent, such as toluene, xylene, petroleum naphtha or mineral lubricating oil is commonly employed. The reaction time is ordinarily from about 0.5 to 10 hours. When the polymerization is completed, the reaction is stopped by quenching with an alcohol, thus deactivating the catalyst and precipitating the copolymer product from the inert hydrocarbon diluent.

In the present invention, the preferred copolymers are derived from cracked wax olefin mixtures of (A) α-olefins of from about 6 to 22 carbon atoms and (B) diolefins of from about 6 to about 20 carbon atoms. Such cracked wax olefin copolymers are described in copending application Ser. No. 148,212, filed Dec. 31, 1962.

The cracked wax olefin mixtures are suitably prepared by thermocracking of conventional refined paraffin waxes derived from typical waxy crude oils. While about 90 percent by weight of the wax is normal paraffins, the balance of the wax composition is made up of isoparaffins, naphthenes and small proportions of aromatic hydrocarbons. The wax is cracked at temperatures of about 500° to about 600° F. with exposure times of only a few seconds. The resulting distribution of olefins may then be distilled to separate into various fractions. For further description of the process, see U. S. Patent No. 2,172,228.

The analysis of a typical cracked wax olefin mixture indicates the following distribution of products:

TABLE I

| | Weight, Percent |
|---|---|
| Straight-chain α-olefins | 89 |
| Straight-chain a, ω-diolefins | 5 |
| Straight-chain α-internal olefins | 1 |
| Branched-chain and naphthenic hydrocarbons | 3 |
| Conjugated internal diolefins, etc. | 2 |

Illustrative of various olefins which may be used are ethylene, butylene, hexene-1, octene-1, nonene-1, decene-1, undecene-1, tridecene-1, tetradecene-1, pentadecene-1, octadecene-1, eicosene-1, heneicosene-1, and docosene-1. Illustrative of diolefins, which have one or both of the olefins terminally situated, are 1,7-octadiene, 1,9-decadiene, 1,11-dodecadiene, 1,4-hexadiene, 1,11-hexadecadiene, 1,10-dodecadiene, etc.

The resulting olefinic containing polymer may then be reacted by various means known in the art to form a monohydroxy or dihydroxy compound. One method of forming the dihydroxy compound in the 1,3-positions is the Prins reaction. The reaction is carried out by dissolving the polymer in a suitable hydrocarbon solvent, e.g., benzene and adding the polymeric solution to a mixture of glacial acetic acid, formaldehyde and concentrated sulfuric acid. The mixture is then heated to temperatures in the range of about 50° to 85° C. for periods of from about 6 to 24 hours. The product formed is the acetate ester which can then be hydrolized by a suitable base or acid, e.g., sodium hydroxide.

To form the 1,2-glycol, various oxidants may be used such as potassium permanganate, osmium tetroxide, lead tetraacetate, etc. Methods of forming 1,2-glycols are well known in the art and do not require exemplification here. See for example Organic Syntheses, Coll. Vol. III, p. 217; Organic Reactions, Vol. 7, p. 378.

Finally, the monohydroxy derivative can be prepared from the olefin, although not by direct hydration. Suitably, hydrogen bromide can be added to the olefins and then the bromide displaced with either hydroxyl or a carboxylate and the carboxylate subsequently hydrolized to form the desired alcohol. All of these methods of preparation are known for the lower molecular weight olefins, and in a number of cases for the polymeric olefins as well. Only minor modification of the procedures would be required for the polymer as compared to the lower molecular weight olefins.

The monohydroxylated or dihydroxylated (glycol) derivatives (that is, mono- or dihydroxylated per olefin present in the polymer) are then treated with biuret in an inert solvent at a temperature in the range of about 100° to 150° C. for a period of time in the range of about 6 to 24 hours. The mole ratio of biuret will generally be in the range of about 1 to 10 moles per alcoholic group present. It is found that even with the glycols generally only one of the alcoholic groups is reactive and forms the allophanate, the other hydroxyl on the same side chain remaining unsubstituted.

The following examples are offered by way of illustration and not by way of limitation.

*Example A.—Preparation of a Ziegler polymer*

In this example, a "Ziegler-type" high molecular weight unsaturated polymer is synthesized from a 20:20:60 mixture of cracked wax olefins of $C_{9-11}:C_{11-15}:C_{15-20}$ fractions.

TABLE II

| No. of Carbon Atoms | Olefin Fractions (Mole Percent) | | |
|---|---|---|---|
| | $C_{9-11}$ | $C_{11-15}$ | $C_{15-21}$ |
| 8 | 1 | | |
| 9 | 22 | | |
| 10 | 55 | 1 | |
| 11 | 21 | 13 | |
| 12 | 1 | 24 | |
| 13 | | 24 | 1 |
| 14 | | 24 | |
| 15 | | 13 | 12 |
| 16 | | 1 | 19 |
| 17 | | | 18 |
| 18 | | | 18 |
| 19 | | | 17 |
| 20 | | | 14 |
| 21 | | | 1 |

Into the reaction flask is charged 200 g. of the cracked wax olefin mixture described above and 5 g. of phenyl β-naphthylamine. The charge is heated to about 100° C. and the equipment and charge are purged with nitrogen to remove oxygen.

The co-catalyst mixture consists of 4.5 g. of titanium trichloride AA (aluminum activated) in 50 ml. of xylene and 2.9 ml. of ethyl aluminum dichloride in 50 ml. of xylene, which are added to the reaction flask. The rate of addition of cocatalyst was controlled to maintian the reaction temperature at about 100° to 110° C. External cooling may be required in order to maintain this temperature.

After about 3 hours, the evolution of heat ceases and the reaction is stopped. To the mixture, 40 ml. of ethanolamine is added and the mixture stirred for about 30 minutes. The polymeric product is then precipitated with methanol, dissolved in benzene and azeotroped free of methanol.

*Example 1*

Into a reaction flask was introduced 1 liter of glacial acetic acid, 180 g. of paraformaldehyde and 300 g. of concentrated sulfuric acid (96 weight percent). To the suspension thus formed was added a solution of 126 g. of a polymer prepared as described in Example A of about 200,000 molecular weight in about 1.1 liters of benzene. The mixture was refluxed at abut 185° F. for 15.5 hours and then cooled. Methanol was added to the reaction mixture, the mixture allowed to separate, the supernatant liquid removed and then the polymer extracted with methanol. The polymer was redissolved in mixed hexanes and twice precipitated with acetone, then being redissolved again in benzene.

A 53 g. sample of the polymer dissolved in toluene to form a 13 weight percent solution was refluxed overnight with 80 ml. of a 0.5 N KOH solution (2.8 g. potassium hydroxide per 100 ml. isopropanol). After cooling the reaction mixture, the solution was acidified with concentrated hydrochloric acid. The polymer was precipitated twice with acetone, being redissolved each time in toluene. Analysis of the poly(1,3-glycol) showed weight percent oxygen=0.91.

An aliquot of 5 g. of the above poly(1,3-glycol) was dissolved in xylene and 3 g. of biuret added, and the mixture stirred for 20 hours at reflux under nitrogen. The reaction mixture was allowed to cool, then filtered and precipitated twice with methanol and then once with acetone, being redissolved in benzene each time. An infrared spectrum of the sample was consistent with the allophanate structure. Analysis: Wt. percent oxygen=1.79.

A 2.80 weight percent blend of the polyallophanate prepared above was prepared in 130 neutral oil and its viscosity determined: $V_{100}=322.6$ SUS; $V_{210}=65.7$ SUS; V.I.=142.5.

The compositions of this invention can be used with a wide variety of oils to improve the viscosity index of the oil. As viscosity index improvers, they may be used with various base oils which find use as lubricating oils, such as naphthenic base, paraffin base, asphaltic base and mixed base petroleum lubricating oils; also, with other hydrocarbon lubricants, e.g., alkylene polymers (such as polymers of propylene, butylene, etc. and the mixtures thereof), alkylene oxide-type polymers, e.g., propylene oxide polymers; dicarboxylic acid esters, liquid esters of inorganic acids, e.g., phosphorous acids; silicon compounds, etc.

The above base oils may be used individually or in combination whenever miscible or made so by the use of mutual solvents.

The compositions of this invention are compatible with a variety of other additives, such as rust inhibitors, detergents, etc. and may also be used with advantage with other viscosity index improvers, if desired.

As will be evident to those skilled in the art, various modifications on this invention can be made or followed, in the light of the foregoing disclosure and discussion, without departing from the spirit or scope of the disclosure or from the scope of the following claims:

I claim:

1. A lubricating oil composition having in an amount sufficient to provide viscosity index improvement, a polymer of from about 100,000 to 500,000 molecular weight having as a recurring unit a group of the formula:

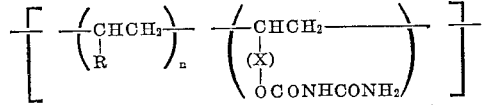

wherein R is an alkyl group of from 4 to 20 carbon atoms, $n$ is an integer of from 10 to 20 and X is selected from the group consisting of alkylene and hydroalkylene of from 4 to 18 carbon atoms.

2. A lubricating oil composition according to claim 1, wherein R is of from 6 to 18 carbon atoms, $n$ is an integer of from 12 to 18 and X is an alkylene group of from 4 to 18 carbon atoms.

3. A lubricating oil composition according to claim 1, wherein R is of from 6 to 18 carbon atoms, $n$ is an integer of from 12 to 18 and X is hydroxyalkylene of from 4 to 18 carbon atoms, wherein the hydroxy group is separated by from 2 to 3 carbon atoms from the first carbonyl group of the allophanic acid.

References Cited

UNITED STATES PATENTS

| | | | |
|---|---|---|---|
| 2,316,903 | 4/1943 | Van Ess et al. | 252—51.5 X |
| 2,352,669 | 7/1944 | Van Ess et al. | 252—51.5 X |
| 2,377,909 | 6/1945 | Van Ess et al. | 252—51.5 |

DANIEL E. WYMAN, *Primary Examiner.*

P. P. GARVIN, *Assistant Examiner.*